Feb. 27, 1962 L. THALER 3,022,648
VENTILATED FINGER RING
Filed Aug. 20, 1958 2 Sheets-Sheet 1
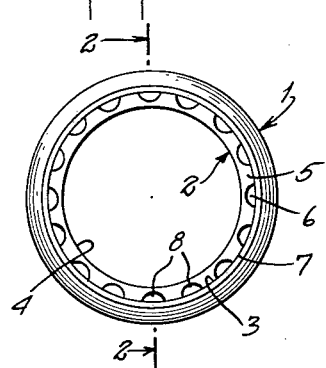
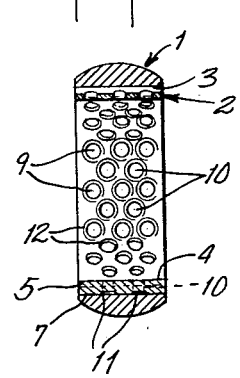
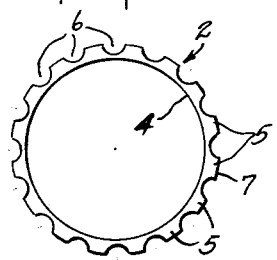
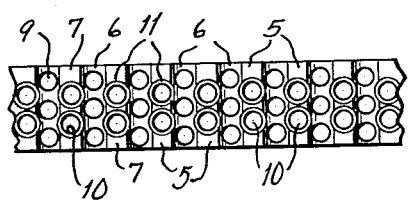
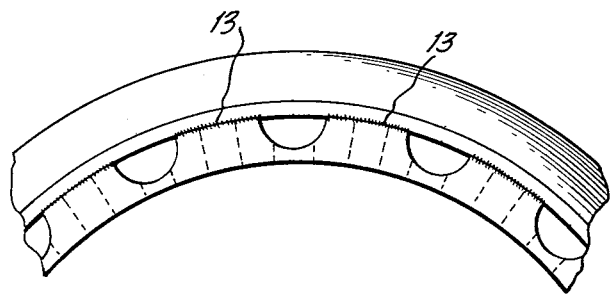
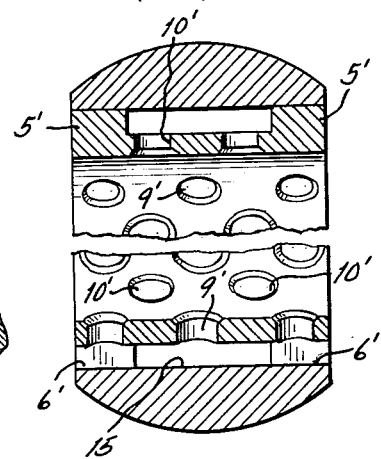
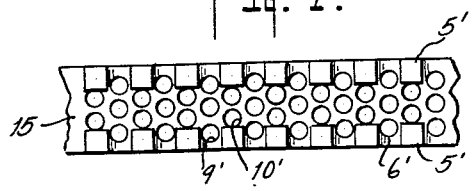
INVENTOR.
LEO THALER
BY H. von Maltitz
ATTORNEYS Feb. 27, 1962 L. THALER 3,022,648
VENTILATED FINGER RING
Filed Aug. 20, 1958 2 Sheets-Sheet 2
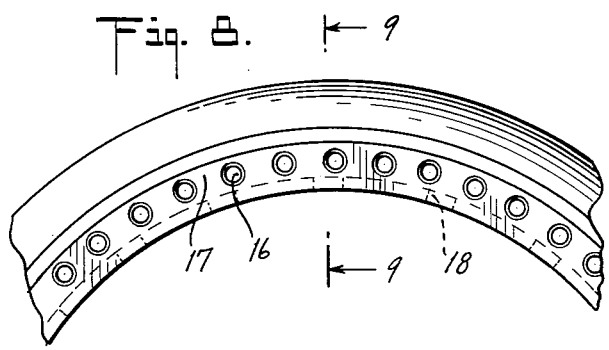
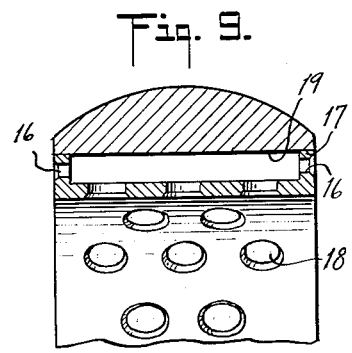
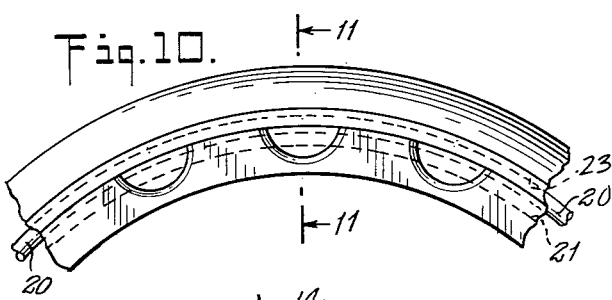
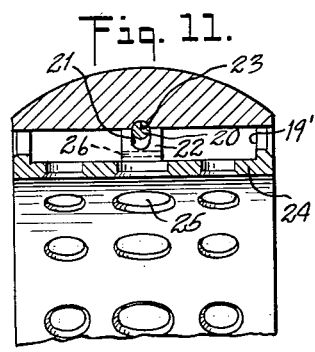
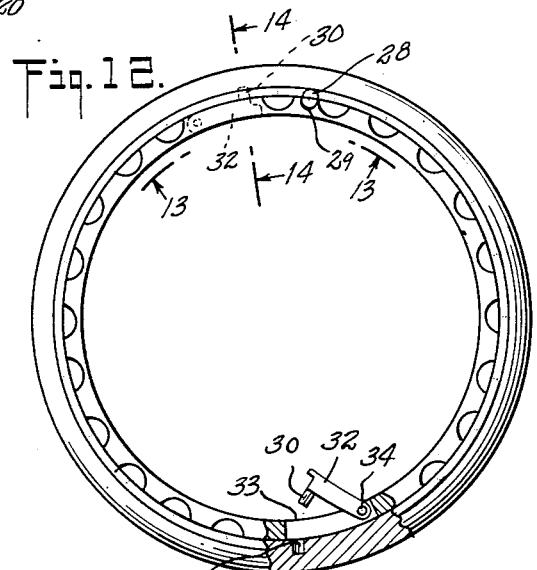
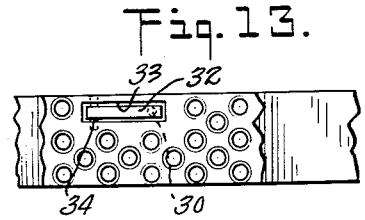
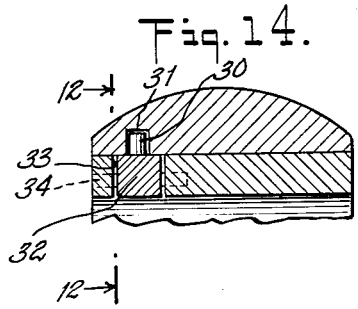
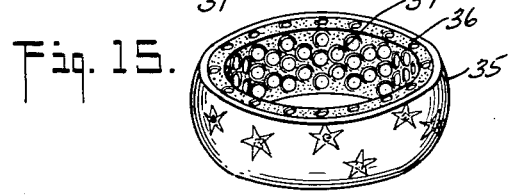
INVENTOR.
LEO THALER
BY
ATTORNEYS _United States Patent Office_ 3,022,648
Patented Feb. 27, 1962

3,022,648
VENTILATED FINGER RING
Leo Thaler, Croton-on-Hudson, N.Y.
(10 Spring St., Northfield, Vt.)
Filed Aug. 20, 1958, Ser. No. 756,140
7 Claims. (Cl. 63—15)

This invention relates to improvements in finger rings and particularly to heavily banded rings such as wedding rings.

A finger ring provided with a heavy band is usually a wide ring covering a relatively broad section of the wearer's finger. Such a wide band of metal on the finger is conductive to perspiring of the skin covered thereby. This condition is unpleasant and annoying and if allowed to persist causes deterioration of the skin with resultant peeling and other effects. Further, because of the difficulty of drying the skin properly under such a wide ring, it is usually left moist after washing operations with results substantially similar to those caused by perspiring.

It is the principal object of this invention to provide an improved ring construction which will function to eliminate the existence of a moist condition under the ring and which will prevent the creation of those conditions that promote perspiring of the skin.

Other objects of the invention, as well as the novel features of construction of a ring embodying such invention, will appear from the following description when read in connection with the accompanying drawings, in which:

FIG. 1 is a side elevational view of a wedding ring made in accordance with the invention;

FIG. 2 is a sectional view taken along the line 2—2 of FIG. 1;

FIG. 3 is a side elevational view of the inner part of the ring shown in FIG. 1;

FIG. 4 is a partial end view on an enlarged scale of the ring part shown in FIG. 3;

FIG. 5 is a side elevational view of a part of a ring constructed similarly to FIG. 1, but with the two ring parts permanently secured together;

FIG. 6 is a broken vertical sectional view of a ring illustrating another embodiment of the invention;

FIG. 7 is a partial end view on a reduced scale of the inner part of the ring shown in FIG. 6;

FIG. 8 is a side elevational view of a part of a ring illustrating a further embodiment of the invention;

FIG. 9 is a sectional view taken along the line 9—9 of FIG. 8;

FIG. 10 is a view similar to FIG. 8 and illustrates a ring construction according to the invention in which the inner part of the ring is releasably connected to the outer part thereof;

FIG. 11 is a sectional view taken along the line 11—11 of FIG. 10;

FIG. 12 is a side elevational view of a ring having the construction of the ring in FIG. 1 and additionally provided with latching mechanism to releasably connect the two ring parts together;

FIG. 13 is a partial view looking in the direction of the line 13—13 in FIG. 12;

FIG. 14 is a sectional view taken along the line 14—14 in FIG. 12; and

FIG. 15 is a perspective view showing a still further embodiment of the invention;

In FIGS. 1 to 4 of the drawings, the reference numeral 1 indicates generally the outer ring part or member and the numeral 2 indicates generally the inner part or member of the ring. The outer member 1 is preferably in the form of a complete ring such as the wedding ring illustrated. The ring member 1 may be provided with stones and other ornamentation as is customary in complete rings. The interior diameter of member 1, however, should be made larger than the usual interior diameter of a complete ring of a particular size to an extent determined by the thickness of the inner ring member 2. The inner wall 3 of ring member 1 is a plain, smooth ring-shaped surface substantially cylindrical in form.

The inner ring member 2 which is in the nature of a liner, is generally cylindrically shaped and is composed of a plain ring-shaped inner surface 4 that fits smoothly on the wearer's finger. The diameter of such inner surface 4 is determined by the size of the ring and is comparable to the inner surface of the usual complete ring. The outer surface of member 2 is composed of a series of transverse ridges 5 spaced by transverse grooves 6 so that such outer surface is of corrugated appearance. The outer surfaces 7 of the ridges have a width substantially equal to the width of the outer open ends of the grooves 6 and are convexly shaped to form as a whole a cylindrical surface concentric to the inner surface 4. The cylindrical surface defined by the spaced outer ridge surfaces 7 has a diameter substantially equal to that of the inner wall 3 of member 1 so that it will engage the latter with a snug fit when member 2 is inserted into member 1 to maintain such members in assembled relation solely by the frictional contact therebetween. The ridge surfaces 7 or the inner wall 3 of member 1 may be given a slight taper toward one side thereof to facilitate the assembly and frictional locking together of the two members. The ridges 5 and grooves 6 extend across the entire width of the inner ring member to provide a series of spaced passageways across the ring when members 1 and 2 thereof are assembled, the ends of these passageways terminating in openings 8 at the sides of the ring. Since the thickness of member 2 is substantial, being preferably greater than $\frac{1}{32}$ of an inch, and the depth of the grooves 6 is only slightly less than the thickness of member 2, the passageways formed by grooves 6 between the members 1 and 2 permit ready circulation of air across the ring.

The inner wall of each groove 6 is provided with a plurality of spaced apertures 9 affording communication between the interior of the ring and the passageways formed by such grooves. Extending through the entire thickness of the ridges 5 are a plurality of apertures 10. The outer ends of the apertures 10 are countersunk at 11 to bring each of such ends into communication with the two passageways between which it is located as is shown more clearly in FIGS. 2 and 4 of the drawings. Thus, the portions of the wearer's skin underlying both the ridges 5 and the grooves 6 of the ring are brought into communication with currents of air passing through the transverse passageways formed by such grooves between the members 1 and 2. These transverse currents of air have the tendency to suck air from the space surrounding the finger portion on which the ring is mounted and through the apertures 9 and 10 into the transverse passages to be discharged at the sides of the ring. Because of this movement of air over the skin throughout the entire inner periphery of the ring, a moist condition of the skin will be avoided. The inner ends of both the apertures 9 and 10 may be countersunk at 12 to prevent any possible injury to the skin and to facilitate the passage of air up through such apertures 9 and 10 and into the passageways formed by the grooves 6.

Instead of depending upon the frictional contact of the surfaces 3 and 7 of the members 1 and 2, respectively, to maintain such members in assembled relation, means such as the solder material 13 shown in FIG. 5 of the drawings, may be provided to maintain the members 1 and 2 in permanently assembled relation. The solder 13 may be applied after the two members have been assembled along the adjoining side edges of the surfaces 3 and 7 at the sides of the ring and then smoothed off to provide a finished appearance, care being taken not to clog the ends of the passageways formed by the grooves 6.

The embodiment illustrated in FIGS. 6 and 7 of the drawings is similar to the construction above described except that the central portions of the ridges 5 have been removed leaving the end portions 5', 5' of such ridges. There is thus formed between the members 1 and 2 a central annular chamber 15 into which the groove ends 6', 6' lead from both sides of the ring and into which those apertures 9' and 10' located between the sides of such chamber extend from the inner wall of the inner ring member. This construction therefore provides a greater amount of air space between the two ring members and accordingly permits greater quantities of air to circulate through the ring. As the outer ends of apertures 10' terminate in chamber 15, they need not be countersunk in the manner of the outer ends of apertures 10.

A construction practically similar to that of FIGS. 6 and 7 is attained by forming the inner ring member so that it is U-shaped in cross-section and then providing apertures 16 in the side walls 17 thereof as shown in FIGS. 8 and 9 of the drawings. In this construction, the apertures 18 bringing the central annular chamber 19 into communication with the interior of the inner ring member, will all be located in the inner wall of such chamber and of similar construction.

Means may also be provided to detachably connect the two ring members together to obviate any possibility of their becoming disassembled in usage yet affording the advantage of ready separation thereof for the purposes of cleaning and repairing. These detachable locking means may comprise a centrally located split spring ring 20 which extends almost completely around the outer periphery of the inner ring member (note FIGS. 10 and 11). The ring 20 is loosely positioned in a circular groove 21 provided in the outer surface of a ring-shaped partition located centrally of the chamber 19'. The ring 20 and groove 21 come into alignment with a circular groove 23 provided centrally in the inner surface of the outer ring member when the ring members are assembled. Normally the ring 20 is expanded so that it projects slightly above the surfaces of the inner ring member which contact with the outer ring member. As such members are assembled the spring will be contracted within the groove 21 until it comes into register with the groove 23 whereupon it will again expand and move into the groove 23 to lock the two ring members together. Transverse pressure on either ring member will cause the spring ring 20 to retract into groove 21 thereby permitting such members to be separated. As in the construction of FIGS. 8 and 9, the inner wall 24 of the central annular chamber 19' is perforated by a plurality of apertures arranged in any suitable fashion. Certain of such apertures, such as the central row of apertures 25, may be so located and of such size as to bring the portions of chamber 19, on opposite sides of the partition 22 into communication with each other as well as with the interior of the liner member. The partition 22 may also be provided with a series of perforations or passageways 26 to bring such chamber portions into communication.

In the construction shown in FIGS. 12 to 14 of the drawings, the two ring members are releasably latched by a pair of lock pins 30 which are carried by the inner ring member and which may be snapped into place in the openings 31 provided in the outer ring member. Each of the pins 30 is preferably provided on one end of a member 32 located in an opening 33 in the inner ring member and pivotally mounted at its other end on a pin 34 extending through the side walls of such opening. When the member 32 is in closed or advanced position its inner surface is substantially flush with and forms a continuation of the inner surface of the inner member. The configurations of the coacting pin 30 and opening 31 are such that the pin 30 will remain in locked position until positively removed therefrom, but may be readily disengaged from such locked position by engaging the free end of the lever member 32 and lifting it about its pivot pin 34. Because the openings 31 will be hidden when the ring members are assembled, it is desirable to provide some means which will indicate when the pins 30 are operatively aligned with their associated openings 31. Such a means may consist of a groove 28 or other suitable marker provided on the outer ring member and a similar means 29 provided on the inner ring member. The grooves 28 and 29 are so positioned on the ring members that when they are matched as illustrated in FIG. 12 of the drawings, the pins 30 and openings 31 will be in proper relation to interlock.

In the constructions hereinabove described, it has been indicated that the inner ring member or liner is made of metal material. It will be understood, however, that such member may be made of a material other than metal, such as for example, cork or plastic material. FIG. 15 of the drawings, illustrates an ornamental ring 35 provided with a non-metallic inner member 36. As in the case of the metal inner members, however, the member 36 is provided with apertures or pores 37 which permit the circulation of air over the skin underlying the ring in accordance with the invention. As in the case of the metallic inner member also, the inner member 36 may only frictionally engage with the ring 35, may be detachably connected to such ring by mounting it on a suitable frame and employing the locking means shown in FIGS. 10 to 14, and may be permanently connected to the ring by cement or other suitable means.

While I have hereinabove described and illustrated in the drawings preferred embodiments of my invention, it will be understood by those skilled in the art that further modifications thereof may be made within the spirit of the invention and the scope of the appended claims.

I claim:

1. A ventilated finger ring comprising an outer continuous annular ring member, an inner continuous annular ring member connected to and within said outer member and having an inner annular surface defining a finger receiving opening, said members being substantially rigid and having opposed abutting surfaces which are being complemental and are configured to form substantially rigid air conducting means interiorly therebetween, said rigid air conducting means including at least one passage forming wall recessed in a ring member, said inner ring member inner surface having radial perforations providing free communication in the complete ring between said finger receiving opening and said interior air conducting means, and said ring having sides having transverse openings providing free communication in the complete ring between atmosphere at the sides and said interior air conducting means, said interior air conducting means being configured to provide free communication between said radial perforations and the transverse openings on both sides of said ring so as to permit air to freely circulate between the finger receiving opening of said inner member and the atmosphere at the sides of the ring and between the atmosphere at both sides of said ring, and thereby when the ring is worn to provide for free circulation of air between said ring and the finger of the wearer.

2. A finger ring such as defined in claim 1, including means for detachably connecting said inner and outer ring members together.

3. A finger ring such as defined in claim 1, in which the said opposed surface of said inner member is composed of a series of transverse ridges extending from side to side of said ring so that such opposed surface of said inner member is of corrugated shape and said air conducting means is constituted of a plurality of spaced transverse grooves, the ends of said grooves terminating in said openings at the side of said ring and said radial perforations communicating with said grooves intermediate the ends of said grooves.

4. A finger ring such as defined in claim 3, in which a plurality of said radial perforations are located in spaced transverse areas defined by said grooves, and in which a plurality of said radial perforations are located in said ridges, each radial perforation located in a ridge being in communication with two adjacent grooves.

5. A finger ring such as defined in claim 1, in which said air conducting means is in the form of an inner annular chamber defined by inner, outer and side walls and of substantial width, said radial perforations opening into said chamber at said inner wall thereof, and said transverse side openings communicating with said chamber at the side walls thereof.

6. A finger ring such as defined in claim 1, in which said radial apertures each have a diameter substantially less than the width of the inner surface of said inner ring member and are arranged in said surface as a plurality of adjacent ringed series of perforations.

7. A finger ring such as defined in claim 1, in which the outer ends of said radial perforations are countersunk.

References Cited in the file of this patent

UNITED STATES PATENTS

| | | |
|---|---|---|
| 1,146,543 | Abel | July 13, 1915 |
| 1,308,894 | Dinhofer | July 8, 1919 |
| 1,422,819 | Blaicher | July 18, 1922 |
| 2,168,490 | Moss | Aug. 8, 1939 |
| 2,184,060 | Singer | Dec. 19, 1939 |
| 2,306,317 | Morrow | Dec. 22, 1942 |
| 2,450,762 | Marshall | Oct. 5, 1948 |

FOREIGN PATENTS

| | | |
|---|---|---|
| 20,155 | Great Britain | Oct. 25, 1895 |